(12) United States Patent
Satoh et al.

(10) Patent No.: US 11,466,106 B2
(45) Date of Patent: Oct. 11, 2022

(54) LATEX OF ACID-MODIFIED CONJUGATED DIENE-BASED POLYMER, AND METHOD FOR MANUFACTURING SAME

(71) Applicant: ZEON CORPORATION, Tokyo (JP)

(72) Inventors: Yoshitaka Satoh, Tokyo (JP); Hidetake Ishii, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 161 days.

(21) Appl. No.: 16/975,967

(22) PCT Filed: Feb. 22, 2019

(86) PCT No.: PCT/JP2019/006725
§ 371 (c)(1),
(2) Date: Aug. 26, 2020

(87) PCT Pub. No.: WO2019/171981
PCT Pub. Date: Sep. 12, 2019

(65) Prior Publication Data
US 2021/0040246 A1   Feb. 11, 2021

(30) Foreign Application Priority Data

Mar. 8, 2018   (JP) .............................. JP2018-041940

(51) Int. Cl.
| | | |
|---|---|---|
| *C08F 255/10* | (2006.01) | |
| *C08F 8/46* | (2006.01) | |
| *C08F 236/08* | (2006.01) | |
| *C08F 297/04* | (2006.01) | |
| *C08F 220/06* | (2006.01) | |
| *C08F 222/02* | (2006.01) | |
| *C08F 36/08* | (2006.01) | |
| *C08J 5/18* | (2006.01) | |
| *C09J 147/00* | (2006.01) | |
| *C09J 153/02* | (2006.01) | |
| *C08F 220/04* | (2006.01) | |

(52) U.S. Cl.
CPC .......... *C08F 36/08* (2013.01); *C08F 297/046* (2013.01); *C08J 5/18* (2013.01); *C09J 147/00* (2013.01); *C09J 153/025* (2013.01); *C08F 8/46* (2013.01); *C08F 220/04* (2013.01); *C08F 220/06* (2013.01); *C08F 222/02* (2013.01); *C08F 236/08* (2013.01); *C08F 255/10* (2013.01); *C08F 2810/20* (2013.01); *C08J 2347/00* (2013.01); *C08J 2353/02* (2013.01)

(58) Field of Classification Search
None
See application file for complete search history.

(56) References Cited

U.S. PATENT DOCUMENTS

| | | | |
|---|---|---|---|
| 3,971,746 A * | 7/1976 | Hirai .......................... | C08J 3/07 524/394 |
| 4,251,409 A | 2/1981 | Neubert | |
| 4,285,850 A | 8/1981 | Neubert | |
| 4,289,683 A | 9/1981 | Neubert | |
| 4,300,972 A | 11/1981 | Neubert | |
| 2015/0376322 A1 | 12/2015 | Nakamura et al. | |
| 2019/0010271 A1 | 1/2019 | Kodemura et al. | |

FOREIGN PATENT DOCUMENTS

| | | |
|---|---|---|
| JP | S55-142635 A | 11/1980 |
| WO | 2014/129547 A1 | 8/2014 |
| WO | 2017/130889 A1 | 8/2017 |

OTHER PUBLICATIONS

May 14, 2019 International Search Report issued in International Patent Application No. PCT/JP2019/006725.
Sep. 8, 2020 International Preliminary Report on Patentability issued in International Patent Application No. PCT/JP2019/006725.

* cited by examiner

*Primary Examiner* — Richard A Huhn
(74) *Attorney, Agent, or Firm* — Oliff PLC

(57) ABSTRACT

A latex of an acid-modified conjugated diene polymer including the acid-modified conjugated diene polymer obtained by modifying a conjugated diene polymer with an acid group-containing compound, in which a content of a structural unit derived from the acid group-containing compound is 0.2 to 0.7 parts by weight with respect to 100 parts by weight of the acid-modified conjugated diene polymer; a content of a water-soluble polymer in the latex is 2 parts by weight or less with respect to 100 parts by weight of the acid-modified conjugated diene polymer; when a solids content of the latex is adjusted to 60 wt %, a viscosity at 25° C. is 800 mPa·s or less; and when the solids content of the latex is adjusted to 50 wt %, the viscosity at 25° C. is 300 mPa·s or less.

11 Claims, No Drawings

LATEX OF ACID-MODIFIED CONJUGATED DIENE-BASED POLYMER, AND METHOD FOR MANUFACTURING SAME

TECHNICAL FIELD

The present invention relates to a latex of an acid-modified conjugated diene polymer and a method for producing the same, more particularly to a latex of an acid-modified conjugated diene polymer that can provide molded films having excellent tensile strength and tear strength and a method for producing the same.

BACKGROUND ART

Conventionally, molded films such as dip-molded products obtained by dip-molding latex compositions containing natural or synthetic rubber latex have been suitably used as nipples, air balls, gloves, balloons, stalls, and the like.

For example, Patent Document 1 discloses a latex of carboxy-modified synthetic polyisoprene obtained by graft-polymerizing synthetic polyisoprene with a monomer having a carboxyl group in an aqueous phase. However, when the latex obtained by the technique of Patent Document 1 is famed into a molded film such as a dip-molded product, the resultant molded film does not have sufficient tear strength, and therefore improvement of the tear strength is desired.

RELATED ART

Patent Documents

Patent Document 1: International Publication No. WO 2014/129547

SUMMARY OF THE INVENTION

Problem to be Solved by the Invention

The present invention is completed in view of solving the problem above. An object of the present invention is to provide a latex of an acid-modified conjugated diene polymer that can provide molded films having excellent tensile strength and tear strength.

Means for Solving the Problem

As a result of dedicated research to achieve the aforementioned object, the inventors have found that with regard to a latex comprising an acid-modified conjugated diene polymer obtained by modifying a conjugated diene polymer with an acid group-containing compound, a molded film such as a dip-molded product obtained by using the latex exhibits excellent tensile strength and tear strength when a content of a structural unit derived from the acid group-containing compound falls within a certain range with respect to the acid-modified conjugated diene polymer, a content of a water-soluble polymer in the latex is a certain amount or less, and a viscosity of the latex under a certain condition is a certain value or less, and have accomplished the present invention.

That is, the present invention provides a latex of an acid-modified conjugated diene polymer comprising the acid-modified conjugated diene polymer obtained by modifying a conjugated diene polymer with an acid group-containing compound, wherein a content of a structural unit derived from the acid group-containing compound is 0.2 to 0.7 parts by weight with respect to 100 parts by weight of the acid-modified conjugated diene polymer; a content of a water-soluble polymer in the latex is 2 parts by weight or less with respect to 100 parts by weight of the acid-modified conjugated diene polymer; when a solids content of the latex is adjusted to 60 wt %, a viscosity at 25° C. is 800 mPa·s or less; and when the solids content of the latex is adjusted to 50 wt %, the viscosity at 25° C. is 300 mPa·s or less.

In the latex of the acid-modified conjugated diene polymer according to the present invention, the conjugated diene polymer is preferably synthetic polyisoprene and/or styrene-isoprene-styrene block copolymer, and is more preferably synthetic polyisoprene.

Further, the present invention provides a method for producing a latex of an acid-modified conjugated diene polymer comprising: a step of reacting a conjugated diene polymer with an acid group-containing compound in an organic solvent having an SP value in the range from 7.2 to 10 $(cal/cm^3)^{1/2}$, thereby obtaining an organic solvent solution of the acid-modified conjugated diene polymer in which a content of a structural unit derived from the acid group-containing compound is 0.2 to 0.7 parts by weight with respect to 100 parts by weight of the polymer; a step of emulsifying the organic solvent solution of the acid-modified conjugated diene polymer in water in the presence of a surfactant to obtain an emulsified dispersion; a step of removing the organic solvent from the emulsified dispersion; and a step of concentrating the emulsified dispersion from which the organic solvent is removed by a centrifugation process or microfiltration.

In the method for producing the latex of the acid-modified conjugated diene polymer according to the present invention, the conjugated diene polymer is preferably synthetic polyisoprene and/or styrene-isoprene-styrene block copolymer, and is more preferably synthetic polyisoprene.

In the method for producing the latex of the acid-modified conjugated diene polymer according to the present invention, the synthetic polyisoprene is preferably obtained by polymerization with an alkyl lithium polymerization catalyst.

In the method for producing the latex of the acid-modified conjugated diene polymer according to the present invention, the reaction of the acid group-containing compound with the conjugated diene polymer is preferably pertained by using an azo compound-based polymerization catalyst.

Further, the present invention provides a latex composition comprising the above-mentioned latex of the acid-modified conjugated diene polymer and a linking agent.

In addition, the present invention provides a molded film composed of the above-mentioned latex composition.

Further, the present invention provides a substrate with an adhesive layer obtained by forming the adhesive layer on a surface of the substrate, the adhesive layer being famed by using the above-mentioned latex of the acid-modified conjugated diene polymer.

Effects of Invention

The present invention can provide a latex of an acid-modified conjugated diene polymer that can provide molded films having excellent tensile strength and tear strength.

DESCRIPTION OF EMBODIMENTS

The latex of the acid-modified conjugated diene polymer according to the present invention is a latex comprising an acid-modified conjugated diene polymer obtained by modifying a conjugated diene polymer with an acid group-containing compound, wherein a content of a structural unit derived from the acid group-containing compound is 0.2 to 0.7 parts by weight with respect to 100 parts by weight of the acid-modified conjugated diene polymer, a content of a water-soluble polymer in the latex is 2 parts by weight or less with respect to 100 parts by weight of the acid-modified conjugated diene polymer, when a solids content of the latex is adjusted to 60 wt %, a viscosity at 25° C. is 800 mPa·s or less, and when the solids content of the latex is adjusted to 50 wt %, the viscosity at 25° C. is 300 mPa·s or less.

<Conjugated Diene Polymer>

The conjugated diene polymer used in the present invention is not particularly limited so long as it contains a monomer unit derived from a conjugated diene monomer, and may be either natural rubber or synthetic rubber. However, from the viewpoint of effectively preventing occurrence of allergic symptoms when obtained molded films such as dip-molded products are used for the purpose of being used in contact with a human body such as nipples, air balls, gloves, balloons, stalls, and the like, the synthetic rubber is preferable.

Although any natural rubber can be used without limitation, examples thereof include homopolymers and copolymers of conjugated diene monomers such as synthetic polybutadiene, synthetic polyisoprene, and synthetic polychloroprene; copolymers of conjugated diene monomers with other monomers copolymerizable therewith, such as styrene-butadiene copolymers, styrene-isoprene copolymers, styrene-isoprene-styrene block copolymers, acrylonitrile-butadiene copolymers, acrylonitrile-isoprene copolymers, acrylonitrile-butadiene-isoprene copolymers, and butyl acrylate-butadiene copolymers; and the like. Among these, synthetic polyisoprene and/or styrene-isoprene-styrene block copolymers are preferable since the excellent tensile strength and elongation are exhibited when famed into molded films such as dip-molded products.

Hereinafter, explanations will be made by exemplifying a case in which the conjugated diene polymer used in the present invention is the synthetic polyisoprene and/or the styrene-isoprene-styrene block copolymer. However, the present invention is not limited to the case of synthetic polyisoprene and/or styrene-isoprene-styrene block copolymer.

The synthetic polyisoprene used in the present invention is a polymer of isoprene obtained by polymerizing isoprene. The synthetic polyisoprene may be an isoprene homopolymer or may be a copolymer of isoprene with other ethylenically unsaturated monomer(s) copolymerizable with isoprene. The content of isoprene units in the synthetic polyisoprene is preferably 70 wt % or more, more preferably 90 wt % or more, further more preferably 95 wt % or more, particularly preferably 100 wt % (a homopolymer of isoprene) with respect to the total monomer units to facilitate preparation of a molded film, such as a dip-molded product, which is flexible and has excellent tensile strength.

Examples of the other ethylenically unsaturated monomers copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrenes; ethylenically unsaturated carboxylic acid ester monomers such as methyl (meth)acrylate (which means "methyl acrylate and/or methyl methacrylate", and hereinafter, the same applies to ethyl (meth)acrylate and the like), ethyl (meth)acrylate, butyl (meth)acrylate, and 2-ethylhexyl (meth)acrylate; and the like. One of these ethylenically unsaturated monomers copolymerizable with isoprene may be used alone, or two or more of them may be used in combination.

The synthetic polyisoprene can be obtained by solution polymerization of isoprene and, if necessary, other copolymerizable ethylenically unsaturated monomers in an organic solvent using a polymerization catalyst. The polymerization catalyst used at this time is not particularly limited, and examples thereof include a Ziegler-based polymerization catalyst made of trialkylaluminum-titanium tetrachloride and an alkyl lithium polymerization catalyst such as n-butyllithium and sec-butyllithium. However, from the viewpoint that a high molecular weight synthetic polyisoprene is easily obtained, and thereby, the tensile strength of the resultant molded film such as the dip-molded product can be further increased, the alkyl lithium polymerization catalyst is preferably used, and more preferably, the n-butyllithium is used.

The polymer solution of the synthetic polyisoprene obtained by the solution polymerization may be used as it is for a reaction with an acid group-containing compound to be described later, but it can also be used for the reaction with the acid group-containing compound once the solid synthetic polyisoprene is taken out and then dissolved in an organic solvent. At this time, impurities such as the residual polymerization catalyst remaining in the polymer solution after the synthesis may be removed. Further, an antioxidant described below may be added to the solution during or after the polymerization. And, a commercially available solid synthetic polyisoprene can be used.

Examples of the organic solvent used in obtaining a polymer solution of synthetic polyisoprene include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, still more preferably 500 to 1,000 parts by weight, and particularly preferably 100 to 400 parts by weight with respect to 100 parts by weight of the synthetic polyisoprene.

There are the following four types of isoprene units in the synthetic polyisoprene which differ in bonding geometry of isoprene units: cis bond unit, trans bond unit, 1,2-vinyl bond unit, and 3,4-vinyl bond unit. From the viewpoint of improving the tensile strength of the resultant molded film such as the dip-molded product, the content ratio of cis bond units among the isoprene units contained in the synthetic polyisoprene is preferably 70 wt % or more, more preferably 90 wt % or more, and still more preferably 95 wt % or more, with respect to the total isoprene unit.

The weight average molecular weight of the synthetic polyisoprene is preferably from 10,000 to 5,000,000, more preferably from 500,000 to 5,000,000, and still more preferably from 800,000 to 3,000,000, as determined relative to polystyrene standard by gel permeation chromatography. By setting the weight average molecular weight of the synthetic polyisoprene within the above range, it is possible to further enhance the tensile strength when famed to the molded film such as the dip-molded product, and it tends to be easy to manufacture a latex using the synthetic polyisoprene.

Further, a polymer Mooney viscosity (ML1+4, 100° C.) of the synthetic polyisoprene is preferably from 50 to 100, more preferably from 60 to 95, even more preferably from 70 to 90, and most preferably from 75 to 85.

The styrene-isoprene-styrene block copolymer is a block copolymer of styrene and isoprene (SIS) (the character "S" represents a styrene block, and the character "I" represents an isoprene block).

The SIS can be obtained by a conventionally known method, for example, by block copolymerizing isoprene and styrene in an organic solvent by using an active organometallic such as n-butyllithium as an initiator. Then, the obtained polymer solution of SIS may be used as it is for the reaction with the acid group-containing compound to be described later, but once the solid SIS is taken out, it can also be used for the reaction with the acid group-containing compound in a state of being dissolved in the organic solvent. At this time, impurities such as the residual polymerization catalyst remaining in the polymer solution after the synthesis may be removed. Further, an antioxidant described below may be added to the solution during or after the polymerization. And, a commercially available solid SIS can be used.

As the organic solvent, the same as in the case of the above synthetic polyisoprene can be used, and an aromatic hydrocarbon solvent and an alicyclic hydrocarbon solvent are preferred, and cyclohexane and toluene are particularly preferred.

Note that the amount of the organic solvent to be used is usually 50 to 2,000 parts by weight, preferably 80 to 1,000 parts by weight, more preferably 10 to 500 parts by weight, and still more preferably 150 to 300 parts by weight, with respect to 100 parts by weight of SIS.

<Latex of Acid-Modified Conjugated Diene Polymer>

The latex of the acid-modified conjugated diene polymer according to the present invention is a latex containing an acid-modified conjugated diene polymer obtained by modifying a conjugated diene polymer such as synthetic polyisoprene and SIS described above with an acid group-containing compound.

In addition, in the latex of the acid-modified conjugated diene polymer according to the present invention, the content of the structural unit derived from the acid group-containing compound is 0.2 to 0.7 parts by weight with respect to 100 parts by weight of the acid-modified conjugated diene polymer, and the content of the water-soluble polymer in the latex is 2 parts by weight or less with respect to 100 parts by weight of the acid-modified conjugated diene polymer, when the solids content of the latex is adjusted to 60 wt %, a viscosity at 25° C. is 800 mPa·s or less, and when the solids content of the latex is adjusted to 50 wt %, the viscosity at 25° C. is 300 mPa·s or less.

The acid-modified conjugated diene polymer contained in the latex according to the present invention is a polymer obtained by modifying a conjugated diene polymer such as synthetic polyisoprene and SIS described above with the acid group-containing compound.

The acid group-containing compound is not particularly limited, and examples thereof include a carboxyl group-containing compound, a sulfonic acid group-containing compound, and a phosphoric acid group-containing compound, but a carboxyl group-containing compound is preferred from the viewpoint that the tensile strength and the tear strength of the resultant molded film such as the dip-molded product can be further increased. Specific examples of the carboxyl group-containing compound include ethylenically unsaturated monocarboxylic acids such as acrylic acid and methacrylic acid; ethylenically unsaturated polyvalent carboxylic acids such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial esters such as monobutyl fumarate, monobutyl maleate, and mono-2-hydroxypropyl maleate; and the like. Among these, the ethylenically unsaturated monocarboxylic acids and ethylenically unsaturated polyvalent carboxylic anhydrides are preferred, and the ethylenically unsaturated monocarboxylic acids are more preferred. Further, methacrylic acid and maleic anhydride are preferred, and methacrylic acid is more preferred. Further, those which are soluble in an organic solvent having an SP value (solubility parameter) to be described later in the range from 7.2 to 10 $(cal/cm^3)^{1/2}$ are preferred, those which are soluble in an organic solvent having an SP value in the range from 8 to 9.5 $(cal/cm^3)^{1/2}$ are more preferred, and those which are soluble in an organic solvent having an SP value in the range from 8.5 to 9 $(cal/cm^3)^{1/2}$ are still more preferred. Further, these carboxyl group-containing compounds can also be used as alkali metal salts or ammonium salts. The carboxyl group-containing compound may be used alone, or two or more of them may be used in combination.

The content of the structural unit derived from the acid group-containing compound is 0.2 to 0.7 parts by weight, preferably 0.25 to 0.6 parts by weight, and more preferably 0.37 to 0.55 parts by weight, with respect to 100 parts by weight of the acid-modified conjugated diene polymer. The content of the structural unit derived from the acid group-containing compound is a content based on a weight basis of the structural unit derived from the acid group-containing compound in the acid-modified conjugated diene polymer, and specifically, is a content based on a weight basis of the structural unit derived from the acid group-containing compound when the total weight of the acid-modified conjugated diene polymer is set to 100 parts by weight. When the content of the structural unit derived from the acid group-containing compound is too small, the tensile strength of the resultant molded film such as the dip-molded product decreases, and when the content of the structural unit derived from the acid group-containing compound is too large, an aggregate tends to be generated in the latex of the acid-modified conjugated diene polymer, resulting in inferior stability as a latex. Note that the content of the structural unit derived from the acid group-containing compound can be measured, for example, by conductance measurement. The conductance measurement will be described later.

In addition, in the latex of the acid-modified conjugated diene polymer according to the present invention, the content of the water-soluble polymer in the latex is 2 parts by weight or less, preferably 1.5 parts by weight or less, and more preferably 1 parts by weight or less, with respect to 100 parts by weight of the acid-modified conjugated diene polymer. The lower limit of the content of the water-soluble polymer is not particularly limited, but is usually 0.05 parts by weight or more.

Because the latex of the acid-modified conjugated diene polymer according to the present invention contains an acid-modified conjugated diene polymer obtained by modifying a conjugated diene polymer such as synthetic polyisoprene and SIS described above with an acid group-containing compound, a water-soluble polymer formed by polymerizing an acid group-containing compound used in the modification reaction is inevitably contained in the latex. For example, when methacrylic acid is used as the acid group-containing compound, a methacrylic acid polymer is inevitably contained as the water-soluble polymer. On the other hand, according to the present inventors, it has been found that, by controlling the content of such a water-soluble polymer in the latex within the above range, a molded film molded such as a dip-molded product obtained by using the latex can be made excellent in tear strength while maintaining high tensile strength.

The water-soluble polymer is a polymer exhibiting solubility in water, and may be mainly a polymer derived from the acid group-containing compound used in the modification reaction, and is not particularly limited. The weight average molecular weight (Mw) of the water-soluble polymer is not particularly limited, but is usually 1,500 or more and 50,000 or less, preferably 2,000 or more and 10,000 or less, and more preferably 2,500 or more and 5,000 or less, as determined relative to polystyrene standard by gel permeation chromatography.

Further, the content of the water-soluble polymer in the latex can be determined, for example, by conductance measurement. In this case, the content of the structural unit derived from the acid group-containing compound in the acid-modified conjugated diene polymer can be determined in conjunction with the content of the water-soluble polymer.

In other words, first, with respect to the latex of the acid-modified conjugated diene polymer, the conductance measurement is performed by using a conductance meter and the like, whereby the amount of an acid group (e.g., a carboxyl group) contained in the entire latex of the acid-modified conjugated diene polymer (the initial acid amount X1) is calculated. By this measurement, conductivity based on the acid group derived from the acid-modified conjugated diene polymer and the acid group derived from the water-soluble polymer is measured, and a total amount of these is determined.

Then, a treatment for removing the water-soluble polymer is performed for the latex of the acid-modified conjugated diene polymer. The treatment for removing the water-soluble polymer is not particularly limited, and examples thereof include a method of repeatedly performing a process of diluting the latex with water; a process of centrifuging the diluted latex; and a process of performing the conductance measurement on the latex after centrifugation, and repeatedly performing such processes until the measured value of the conductance does not change.

Then, based on the conductance of the latex after removal of the water-soluble polymer, the amount of the acid group (the post-treatment acid amount X2) contained only in the acid-modified conjugated diene polymer is calculated, and based on this result, the content of the structural unit derived from the acid group-containing compound in the acid-modified conjugated diene polymer can be determined.

Finally, the content of the water-soluble polymer in the latex can be determined based on the difference between the initial acid amount X1 and the post-treatment acid amount X2.

In addition, the latex of the acid-modified conjugated diene polymer according to the present invention has a viscosity of 800 mPa·s or less, preferably 700 mPa·s or less, and more preferably 500 mPa·s or less at 25° C. when the solids content of the latex is adjusted to 60 wt %, and the lower limit thereof is not particularly limited, but is usually 200 mPa·s or more. In addition, the latex of the acid-modified conjugated diene polymer according to the present invention has a viscosity of 300 mPa·s or less, preferably 200 mPa·s or less, and more preferably 180 mPa·s or less at 25° C. when the solids content of the latex is adjusted to 50 wt %, and the lower limit thereof is not particularly limited, but is usually 120 mPa·s or more. If the viscosity at the solids content of 60 wt % and the viscosity at the solids content of 50 wt % are too high, an effect of improving the tear strength of a resultant molded film such as a dip-molded product cannot be obtained.

Note that the viscosity at the solids content of 60 wt % and the viscosity at the solids content of 50 wt % can be measured under a condition of 25° C., for example, by using a Brookfield viscometer (B-type viscometer). In addition, when the solids content is not 60 wt % or 50 wt %, the viscosity measurement may be performed after adjusting the solids content by a method of diluting by adding water or by performing a method of concentration process such as a method of vacuum distillation, normal pressure distillation, centrifugation, and membrane concentration, and preferably by a method of centrifugation.

Method for Producing Latex of Acid-Modified Conjugated Diene Polymer>

The method for producing a latex of the acid-modified conjugated diene polymer according to the present invention is not particularly limited, but the following production method is preferred from the viewpoint that the content of the water-soluble polymer in the latex and the viscosity at the solids content of 60 wt % and the viscosity at the solids content of 50 wt % are easily controlled to be within the above range.

In other words, a producing method comprising: a step of obtaining an organic solvent solution of an acid-modified conjugated diene polymer in which the content of the structural unit derived from the acid group-containing compound is 0.2 to 0.7 parts by weight with respect to 100 parts by weight of the polymer by reacting the acid group-containing compound with the conjugated diene polymer in an organic solvent having an SP value in the range from 7.2 to 10 $(\text{cal/cm}^3)^{1/2}$ (Step A);

a step of obtaining an emulsified dispersion by emulsifying the organic solvent solution of the acid-modified conjugated diene polymer in water in the presence of a surfactant (step B);

a step of removing the organic solvent from the emulsified dispersion (step C); and a step of concentrating the emulsified dispersion from which the organic solvent is removed by a centrifugation process or microfiltration (Step D) is preferred.

(Step A)

A method of reacting an acid group-containing compound with a conjugated diene polymer such as synthetic polyisoprene and SIS described above in an organic solvent is not particularly limited, but a method of graft-reacting the acid group-containing compound with the conjugated diene polymer in the organic solvent is suitable. In this case, the acid-modified conjugated diene polymer is obtained in the state of an organic solvent solution.

As the acid group-containing compound, those described above can be used. The amount of the acid group-containing compound to be used may be such that the content of the structural unit derived from the acid group-containing compound is within the above range with respect to 100 parts by weight of the acid-modified conjugated diene polymer, but is preferably from 0.4 to 20 parts by weight, more preferably from 1 to 10 parts by weight, and still more preferably from 1.5 to 5 parts by weight, with respect to 100 parts by weight of the conjugated diene polymer.

As the organic solvent used in the graft-reaction of the acid group-containing compound with the conjugated diene polymer, those having an SP value (solubility parameter) in the range from 7.2 to 10 $(cal/cm^3)^{1/2}$ may be used, but from the viewpoint that the conjugated diene polymer and the acid group-containing compound can be suitably dissolved, it is more preferable to use the organic solvent having the SP value in the range from 8 to 9.5 $(cal/cm^3)^{1/2}$, and it is further preferable to use the organic solvent having the SP value in the range from 8.5 to 9 $(cal/cm^3)^{1/2}$. Examples of such an organic solvent include benzene (SP value: 9.2 $(cal/cm^3)^{1/2}$), toluene (SP value: 8.9 $(cal/cm^3)^{1/2}$), xylene (SP value: 8.8 $(cal/cm^3)^{1/2}$), cyclohexane (SP value: 8.2 $(cal/cm^3)^{1/2}$), octane (SP value: 7.6 $(cal/cm^3)^{1/2}$), methyl ethyl ketone (SP value: 9.3 $(cal/cm^3)^{1/2}$), and the like. Note that the SP value is calculated from a boiling point, a critical point, a critical pressure, an enthalpy of vaporization, a liquid molar volume, and the like which are estimated from the molecular structure, and for example, a value defined by a value estimated by using ASPEN PLUS which is a simulation software can be used. The organic solvents having the SP values in the range from 7.2 to 10 $(cal/cm^3)^{1/2}$ may be used alone, or two or more of them may be used in combination. In addition, when the conjugated diene polymer is obtained in a state of the polymer solution of the organic solvent having the SP value in the range from 7.2 to 10 $(cal/cm^3)^{1/2}$, the conjugated diene polymer may be used as the polymer solution for graft-reacting with the acid group-containing compound, or the organic solvent having the SP value in the range from 7.2 to 10 $(cal/cm^3)^{1/2}$ may be further added to the polymer solution of the conjugated diene polymer to graft-react with the acid group-containing compound.

In the organic solvent, when the acid group-containing compound is graft-reacted with the conjugated diene polymer, a graft-polymerization catalyst is preferably used. The graft polymerization catalyst is not particularly limited, but includes inorganic peroxide-based polymerization catalysts such as sodium persulfate, potassium persulfate, ammonium persulfate, potassium perphosphate, hydrogen peroxide; organic peroxide-based polymerization catalyst such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, benzoyl peroxide; azo compound-based polymerization catalysts such as 2,2'-azobisisobutyronitrile, azobis-2,4-dimethylvaleronitrile, and methyl azobisisobutyrate; and the like. Among these, the azo compound-based polymerization catalyst is preferred, and 2,2'-azobisisobutyronitrile is particularly preferred, from the viewpoint that the tear strength of the resultant molded film such as the dip-molded product can be further increased. The graft-polymerization catalyst may be used alone, or two or more of them may be used in combination.

The amount of the graft-polymerization catalyst to be used varies depending on the type thereof, but is preferably from 0.1 to 10 parts by weight, more preferably from 0.2 to 5 parts by weight, with respect to 100 parts by weight of the synthetic isoprene polymer. Further, a method for adding the graft-polymerization catalyst is not particularly limited, and a known addition method such as batch addition, in-portion addition, and continuous addition can be employed.

(Step B)

Then, the organic solvent solution of the acid-modified conjugated diene polymer obtained above is emulsified in water in the presence of a surfactant to obtain an emulsified dispersion.

Preferred surfactant is anionic surfactants, and examples of the anionic surfactant include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphates such as sodium lauryl phosphate and potassium lauryl phosphate; and the like.

Among these anionic surfactants, fatty acid salts, alkylbenzene sulfonates, alkyl sulfosuccinates, alkyl sulfate ester salts, and polyoxyethylene alkyl ether sulfate ester salts are preferable, and fatty acid salts and alkylbenzene sulfonates are particularly preferable.

Further, the use of at least one selected from the group consisting of alkylbenzene sulfonates, alkyl sulfosuccinates, alkyl sulfate ester salts, and polyoxyethylene alkyl ether sulfate ester salts in combination with fatty acid salts is preferable, and the use of an alkylbenzene sulfonate in combination with a fatty acid salt is particularly preferable since a trace amount of the residual polymerization catalyst (in particular, aluminum and titanium) derived from the conjugated diene polymer can be effectively removed, thereby generation of aggregates in the latex is hindered. Here, preferred fatty acid salts are sodium rosinate and potassium rosinate, and more preferred fatty acid salt is sodium rosinate, and preferred alkylbenzene sulfonates are sodium dodecylbenzenesulfonate and potassium dodecylbenzenesulfonate, and more preferred alkylbenzene sulfonates is sodium dodecylbenzenesulfonate. In addition, one of the surfactants may be used alone, or two or more of them may be used in combination.

Further, in the above-mentioned method, a surfactant other than the anionic surfactants may be used in combination, and examples of the surfactant other than the anionic surfactants include copolymerizable surfactants such as sulfoesters of α,β-unsaturated carboxylic acids, sulfate esters of α,β-unsaturated carboxylic acids, and sulfoalkyl aryl ethers. In addition, nonionic surfactants such as polyoxyethylene alkyl ethers, polyoxyethylene alkyl phenol ethers, polyoxyethylene alkyl esters, and polyoxyethylene sorbitan alkyl esters may be used in combination.

The amount of the surfactant to be used, which is contained in the aqueous solution, is preferably 0.1 to 50 parts by weight, more preferably 0.5 to 20 parts by weight, further more preferably 1 to 10 parts by weight with respect to 100 parts by weight of the acid-modified conjugated diene polymer. In the case of using two or more surfactants, the total amount of the surfactants to be used preferably falls within the aforementioned ranges.

Further, the amount of water contained in the aqueous solution of the surfactant is preferably 10 to 1,000 parts by weight, more preferably 30 to 500 parts by weight, most preferably 50 to 100 parts by weight with respect to 100 parts by weight of the organic solvent solution of the acid-modified conjugated diene polymer. Examples of the type of water to be used include hard water, soft water, deionized water, distilled water, zeolite water and the like, and soft water, deionized water, and distilled water are preferable.

As an apparatus for emulsifying the organic solvent solution of the acid-modified conjugated diene polymer in water in the presence of the surfactant, in general, any emulsifying machine or disperser commercially available can be used without limitation. The surfactant can be added to the organic solvent solution of the acid-modified conjugated diene polymer by any method without limitation. The surfactant may be added in advance to either or both of water and the acid-modified conjugated diene polymer, or may be added in batch or in portions to the emulsified dispersion during the emulsification process.

Examples of the emulsifying apparatus which can be used include batch emulsifying machines such as "Homogenizer" (product name, manufactured by IKA Works), "POLYTRON" (product name, manufactured by Kinematica AG), and "TK AUTO-HOMO MIXER" (product name, manufactured by Tokushu Kika Kogyo Co., Ltd.); continuous emulsifying machines such as "TK PIPELINE-HOMO MIXER" (product name, manufactured by Tokushu Kika Kogyo Co., Ltd.), "Colloid mill" (product name, manufactured by Shinko Pantec Co., Ltd.), "SLASHER" (product name, manufactured by NIPPON COKE & ENGINEERING CO., LTD.), "Trigonal wet grinder" (product name, manufactured by Mitsui Miike Chemical Engineering Machinery, Co., Ltd.), "CAVITRON" (product name, manufactured by Eurotec, Ltd.), "MILDER" (product name, manufactured by Pacific Machinery & Engineering Co., Ltd.), and "FINE FLOW MILL" (product name, manufactured by Pacific Machinery & Engineering Co., Ltd.); high-pressure emulsifying machines such as "Microfluidizer" (product name, manufactured by MIZUHO INDUSTRIAL CO., LTD.), "NANOMIZER" (product name, manufactured by NANOMIZER Inc.), and 'APV GAULIN' (product name, manufactured by Manton-Gaulin Company); membrane emulsifying machines such as "Membrane emulsifying machine" (product name, manufactured by REICA Co., Ltd.); vibratory emulsifying machines such as "VIBROMIXER" (product name, manufactured by REICA Co., Ltd.); ultrasonic emulsifying machines such as "Ultrasonic homogenizer" (product name, manufactured by Branson Ultrasonics Corporation); and the like. The conditions for the emulsification process using such an emulsifying apparatus are not particularly limited, and the treatment temperature, the treatment time, and the like may be appropriately determined to ensure a desired dispersion state.

(Step C)

Then, the organic solvent is removed from the emulsified dispersion obtained by the emulsification process. Preferred methods for removing the organic solvent from the emulsified dispersion include methods of reducing the content of the organic solvent to 500 weight ppm or less in the resultant latex of the acid-modified conjugated diene polymer, and for example, methods such as vacuum distillation, normal pressure distillation, water vapor distillation, and the like can be employed.

(Step D)

Then, concentration is performed to the emulsified dispersion from which the organic solvent is removed by a centrifugation process or microfiltration.

The centrifugation is preferably performed, for example, by using a continuous centrifuge under the conditions in which the centrifugal force is preferably 100 to 10,000 G, the solids content of the latex of the acid-modified conjugated diene polymer before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The latex of the acid-modified conjugated diene polymer can be obtained as a light liquid after the centrifugation.

In addition, concentration by the microfiltration can be performed by, for example, a filtration process by using a microfiltration membrane (MF membrane) having a pore size of preferably from 0.2 to 2 μm, more preferably from 0.5 to 1 μm.

According to the manufacturing method as described above, it is possible to suitably obtain the latex of the acid-modified conjugated diene polymer in which the content of the structural unit derived from the acid group-containing compound, the content of the water-soluble polymer in the latex, the viscosity at the solids content of 60 wt % and the solids content of 50 wt % are controlled within a predetermined range according to the present invention.

In particular, according to the above production method, the content of the water-soluble polymer in the resultant latex can be effectively reduced which is obtained by an reacting the acid group-containing compound with the conjugated diene polymer in the organic solvent having the SP value in the range from 7.2 to 10 $(cal/cm^3)^{1/2}$, emulsifying the obtained organic solvent solution of the acid-modified conjugated diene polymer in water, and then concentrating it by the centrifugation process or microfiltration. On the other hand, as described in the international publication No. WO 2014/129547, when the organic solvent solution of the conjugated diene polymer is emulsified in water and brought into a latex state, and then the acid group-containing compound is reacted with the conjugated diene polymer, the content of the water-soluble polymer remaining in the latex tends to be high, and as a result, decrease in the tear strength caused by the water-soluble polymer becomes large.

The solids content of the latex of the acid-modified conjugated diene polymer according to the present invention is preferably 30 to 70 wt %, more preferably 40 to 70 wt %. When the solids content is too low, a resultant molded film such as a dip-molded product becomes thin and easily broken. On the contrary, when the solids content is too high, the viscosity of the latex of the acid-modified conjugated diene polymer increases, and it may be difficult to transfer it in a pipe or mix it in a blending tank.

The volume average particle diameter of the latex of the acid-modified conjugated diene-based polymer is preferably 0.1 to 10 μm, more preferably 0.5 to 3 μm, and still more preferably 0.5 to 2.0 μm. By setting this volume average particle diameter within the above range, the latex viscosity becomes appropriate and easy to handle, and when the latex of the acid-modified conjugated diene polymer is stored, it is possible to suppress the formation of a film on the latex surface.

Further, the latex of the acid-modified conjugated diene polymer according to the present invention may contain additives generally used in the field of latex, such as pH adjusters, defoamers, preservatives, cross-linking agents, chelating agents, oxygen scavengers, dispersants, and antioxidants.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Among these, alkali metal hydroxides and ammonia are preferred.

<Latex Composition>

A latex composition according to the present invention may be produced by compounding a cross-linking agent with the latex of the acid-modified conjugated diene polymer according to the present invention as mentioned above.

Examples of the cross-linking agent include sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-moipholinodithio)benzothiazole; and the like. Among these, sulfur can be preferably used. One of the cross-linking agents may be used alone, or two or more of them may be used in combination.

Although the content of the cross-linking agent is not particularly limited, the content is preferably 0.1 to 10 parts by weight, more preferably 0.2 to 3 parts by weight with respect to 100 parts by weight of the acid-modified conjugated diene polymer constituting the latex of the acid-modified conjugated diene polymer. Adjusting the content of the cross-linking agent within the aforementioned ranges result in a molded film, such as a dip-molded product, having further improved tensile strength.

In addition, preferably, the latex composition according to the present invention further contains a cross-linking accelerator.

As the cross-linking accelerator, any cross-linking accelerator generally used in film-molding such as dip-molding can be used. Examples thereof include dithiocarbamic acids, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazylmercaptomethyl)urea, and the like. Zinc diethyldithiocarbamate, zinc dibutyldithiocarbamate, and zinc 2-mercaptobenzothiazole are preferable. One of the cross-linking accelerators may be used alone, or two or more of them may be used in combination.

The content of the cross-linking accelerator is preferably 0.05 to 5 parts by weight, more preferably 0.1 to 2 parts by weight with respect to 100 parts by weight of the acid-modified conjugated diene polymer constituting the latex of the acid-modified conjugated diene polymer. Adjusting the content of the cross-linking accelerator within the aforementioned ranges result in a molded film, such as a dip-molded product, having further improved tensile strength.

In addition, preferably, the latex composition according to the present invention further contains zinc oxide.

Although the content of the zinc oxide is not particularly limited, the content is preferably 0.1 to 5 parts by weight, more preferably 0.2 to 2 parts by weight with respect to 100 parts by weight of the acid-modified conjugated diene polymer constituting the latex of the acid-modified conjugated diene polymer. Adjusting the content of the zinc oxide within the aforementioned ranges result in a molded film, such as a dip-molded product, having further improved tensile strength while high emulsification stability is provided.

The latex composition according to the present invention can further contain optional compounding agents including antioxidants; dispersants; reinforcers such as carbon black, silica, and talc; fillers such as calcium carbonate and clay; ultraviolet absorbers; and plasticizers.

Examples of the antioxidants include phenolic antioxidants containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester antioxidants such as tris(nonylphenyl)phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline antioxidants such as 6-ethoxy-2,2,4-trimethyl-1,2-dihydroquinoline; hydroquinone antioxidants such as 2,5-di-(t-amyl)hydroquinone; and the like. One of these antioxidants can be used alone, or two or more of them can be used in combination.

The content of the antioxidant is preferably 0.05 to 10 parts by weight, more preferably 0.1 to 5 parts by weight with respect to 100 parts by weight of the synthetic rubber contained in the latex.

The latex composition according to the present invention can be prepared by any method without limitation. Examples thereof include a method of mixing the cross-linking agent and the optional compounding agents with the latex of the acid-modified conjugated diene polymer by using a disperser such as a ball mill, a kneader, and a disperser; a method of preparing an aqueous dispersion of ingredients other than the latex of the acid-modified conjugated diene polymer, and thereafter mixing the aqueous dispersion with the latex of the acid-modified conjugated diene polymer by using the aforementioned disperser; and the like.

The latex composition according to the present invention preferably has a pH of 7 or more, more preferably a pH in the range from 7 to 13, further preferably a pH in the range from 8 to 12. Further, the solids content of the latex composition is preferably in the range from 15 to 65 wt %.

The latex composition according to the present invention is preferably aged (pre-crosslinked) before dip-molding to obtain a dip-molded product having further improved mechanical properties. Although the pre-crosslinking time is not particularly limited and depends also on the pre-crosslinking temperature, the pre-crosslinking time is preferably 1 to 14 days, more preferably 1 to 7 days. The pre-crosslinking temperature is preferably 20 to 40° C.

Then, after the pre-crosslinking, the latex composition is preferably stored at a temperature of 10 to 30° C. until it is fed to a molding process such as the dip-molding. Storage at high temperature results in a molded film, such as the dip-molded product, having reduced tensile strength in some cases.

<Molded Film>

The molded film according to the present invention is a molded product in the form of a film made of the latex composition according to the present invention. The film thickness of the molded film according to the present invention is preferably 0.03 to 0.50 mm, more preferably 0.05 to 0.40 mm, particularly preferably 0.08 to 0.30 mm.

Although not particularly limited, the molded film according to the present invention is suitably a dip-molded product obtained by dip-molding the latex composition according to the present invention. The dip-molding is a method involving immersing a mold in the latex composition to deposit the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used as required.

Specific examples of methods for using the coagulant include a method of attaching the coagulant to the mold by immersing the mold in a coagulant solution before the immersion in the latex composition (anode coagulant dipping), and a method of immersing a mold, on which the latex composition has been deposited, in a coagulant solution (Teague coagulant dipping), and the like. The anode coagulant dipping is preferable in that a dip-molded product having less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant is preferably used in the form of an aqueous solution. The aqueous solution may further contain a water-soluble organic solvent such as methanol or ethanol, and a nonionic surfactant. Although the concentration of the coagulant varies depending on the type of the water-soluble polyvalent metal salts, the concentration is preferably 5 to 50 wt %, more preferably 10 to 30 wt %.

The mold after pulled out of the latex composition is generally heated to dry the deposit famed on the mold. The drying conditions may be appropriately selected.

Then, deposits famed on the mold is heated to be cross-linked.

The heating condition at the time of cross-linking is not particularly limited, but is preferably a heating temperature of 60 to 150° C., more preferably 100 to 130° C., and preferably a heating time of 10 to 120 minutes.

The method of heating is not particularly limited, and examples thereof include a method of heating by heated air in an oven, a method of heating by irradiating infrared rays, and the like.

Further, it is preferable to wash the mold with water or hot water in order to remove water-soluble impurities (e.g., excess surfactant or coagulant) before or after heating the mold on which the latex composition is deposited. The hot water used is preferably 40° C. to 80° C., more preferably 50° C. to 70° C.

The dip-molded product after cross-linking is detached from the mold. Specific examples of the method of detachment include a method of peeling from the mold by hand, a method of peeling off by water pressure or compressed air pressure, and the like. As long as the dip-molded product in the middle of cross-linking has sufficient strength for the detachment, it may be detached in the middle of cross-linking, and after that, the cross-linking may be subsequently continued.

Because the molded film according to the present invention and the dip-molded product which is one embodiment thereof are obtained by using the latex of the acid-modified conjugated diene polymer according to the present invention described above, they are excellent in the tensile strength and tear strength, and for example, can be particularly suitably used as gloves. In the case where the molded film forms a glove, inorganic fine particles made of talc, calcium carbonate, or the like or organic fine particles such as starch particles may be spread on the surface of the glove, an elastomer layer containing fine particles may be famed on the surface of the glove, or the surface layer of the glove may be chlorinated in order to prevent the adhesion of contacting parts of the molded film and allow the glove to be put on and taken off more smoothly.

In addition, the molded film according to the present invention and the dip-molded product which is one embodiment thereof may be used in addition to the above-mentioned gloves, as well as in medical supplies such as baby bottle nipples, droppers, tubes, water pillows, balloon stalls, catheters, and condoms; toys such as air balloons, dolls, and balls; industrial supplies such as pressure molding bags, gas storage bags; and finger stalls; and the like.

<Substrate with Adhesive Layer>

The substrate with the adhesive layer according to the present invention is a composite of a substrate and an adhesive layer, the adhesive layer comprising an adhesive layer famed by using the latex of the acid-modified conjugated diene polymer according to the present invention described above.

Although the substrate is not particularly limited, a fiber substrate can be used, for example. The type of fibers constituting the fiber substrate is not particularly limited, and examples thereof include vinylon fibers, polyester fibers, polyamide fibers such as nylon and aramid (aromatic polyamide) fibers, glass fibers, cotton, rayon, and the like. These can be appropriately selected according to the application. The shape of the fiber substrate is not particularly limited, and examples thereof can include shapes of staples, filaments, cords, ropes, woven fabrics (such as canvas), and the like, which can be appropriately selected according to the application.

Further, the adhesive layer may be formed by using the latex of the acid-modified conjugated diene polymer according to the present invention described above, and may be used as it is without compounding a compounding agent to the latex of the acid-modified conjugated diene polymer according to the present invention described above, or may be used as an adhesive composition by compounding various compounding agents, and the adhesive layer may be famed using such an adhesive composition.

The compounding agent contained in the adhesive composition includes an adhesive resin. Although the adhesive resin is not particularly limited, a resorcinol-formaldehyde resin, a melamine resin, an epoxy resin, and an isocyanate resin can be suitably used, for example. Among these, a resorcinol-formaldehyde resin is preferable. A known resorcinol-formaldehyde resin (such as those disclosed in Japanese Patent Application Laid-Open No. S55-142635) can be used. The reaction ratio of resorcinol to formaldehyde is generally 1:1 to 1:5, preferably 1:1 to 1:3 in terms of the molar ratio of "resorcinol:formaldehyde".

For further enhancing the adhesion, the adhesive composition can contain 2,6-bis(2,4-dihydroxyphenylmethyl)-4-chlorophenol or a similar compound, an isocyanate, a blocked isocyanate, ethylene urea, polyepoxide, modified polyvinyl chloride resin, and the like, which are conventionally used.

Further, the adhesive composition can contain a vulcanization aid. Containing a vulcanization aid can improve the mechanical strength of the substrate with the adhesive layer. Examples of the vulcanization aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenylmaleimide, and N,N-m-phenylenedimaleimide; sulfur; and the like.

The content (solids content) of the synthetic rubber in the adhesive composition is preferably 5 to 60 wt %, more preferably 10 to 30 wt %.

The substrate with the adhesive layer according to the present invention can be obtained by forming the adhesive layer on the substrate with, for example, a method of coating the latex of the acid-modified conjugated diene polymer according to the present invention or the adhesive composition containing the latex to the surface of the substrate; or a method of immersing the substrate in the latex of the acid-modified conjugated diene polymer according to the present invention or the adhesive composition containing the latex.

Such a substrate with an adhesive layer according to the present invention can be used as a substrate-rubber composite by bonding to a rubber via the adhesive layer. Although the substrate-rubber composite is not particularly limited, examples thereof include a toothed rubber belt with a core using a fiber substrate in the form of a cord, a toothed rubber belt using a fiber substrate in the form of a base fabric such as a canvas, and the like.

Although any method for obtaining the substrate-rubber composite can be used without limitation, examples thereof include a method of applying the latex of the acid-modified conjugated diene polymer according to the present invention or the adhesive composition containing the latex to the substrate, for example, by coating method or immersion and the like to obtain the substrate with an adhesive layer, and placing the substrate with the adhesive layer on a rubber, followed by heating and pressurization. The pressurization can be performed by using a compression (press) molding machine, a metal roll, an injection molding machine, or the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables the molding of the rubber and the adhesion between the substrate with the adhesive layer and the rubber to be performed simultaneously. A mold for imparting a desired surface shape to the rubber of the substrate-rubber composite is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate, a rubber, and a base fabric serving as a substrate are layered (at this time, the latex of the acid-modified conjugated diene polymer according to the present invention or the adhesive composition containing the latex has been appropriately applied to the core and the base fabric to form substrates with an adhesive layer), followed by pressurization under heating, so that the substrate-rubber-substrate composite can be obtained.

The substrate-rubber composite obtained using the substrate with an adhesive layer according to the present invention is excellent in mechanical strength such as tensile strength and tear strength, and therefore can be suitably used as a belt such as a flat belt, a V belt, a V-ribbed belt, a round belt, a square belt, and a toothed belt. Further, the substrate-rubber composite obtained by using the substrate with and adhesive layer according to the present invention has excellent oil resistance, and can be suitably used as in-oil belts. In addition, the substrate-rubber composite obtained using the substrate with an adhesive layer according to the present invention can also be suitably used for hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite obtained using the substrate with an adhesive layer according to the present invention can also be used as industrial products such as seals and rubber rolls in addition to the aforementioned applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of QA equipment such as printers and copiers; fiber processing rolls such as stretching rolls for spinning and draft rolls for spinning; steel rolls such as bridle rolls, snubber rolls, and steering rolls; and the like.

EXAMPLES

Hereinafter, the present invention will be described in detail by way of Examples, however, the present invention is not limited to these Examples. In each example, the tam "parts" is based on weight unless otherwise specified. Note that each property was measured to the following effect.

<Weight Average Molecular Weight (Mw) of Conjugated Diene Polymer>

The sample was diluted with tetrahydrofuran so that the solids content was 0.1 wt %, and gel permeation chromatography was performed on this solution to calculate the weight average molecular weight (Mw) of the conjugated diene polymer as determined relative to polystyrene standards.

<Solids Content>

2 g of a sample was accurately weighed (weight:Z2) into an aluminum dish (weight:Z1), followed by drying in a hot air dryer at 105° C. for 2 hours. Subsequently, after cooling in a desiccator, the weight thereof including the aluminum dish was measured (weight: Z3) to calculate the solids content according to the following calculation formula.

Solids content (wt %)=(Z3−Z1)×100/Z2

<Content of Water-Soluble Polymer in Latex of Acid-Modified Conjugated Diene Polymer, Content of Structural Units Derived from Acid Group-Containing Compound, Molecular Weight of Water-Soluble Polymer (Mw)>

With respect to the latex of the acid-modified conjugated diene polymer, conductance measurement was performed by using a conductance meter (product name "SG78-FK2", manufactured by METTLER TOLEDO CO., LTD.), whereby the amount of the acid group (e.g., carboxyl group) contained in the entire latex of the acid-modified conjugated diene polymer (initial acid amount X1) was calculated.

Then, for the latex of the acid-modified conjugated diene polymer, a process of diluting the latex with water, a process of centrifuging the diluted latex to remove an aqueous solution of the water-soluble polymer, and a process of performing conductance measurement on the latex after centrifugation were repeated, and such treatments were repeated until the measured value of the conductance did not change.

Then, based on the conductance of the latex after the removal of the water-soluble polymer, the amount of the acid group contained in only the acid-modified conjugated diene polymer (post-treatment acid amount X2) was calculated, and based on this result, the weight of the structural unit derived from the acid group-containing compound contained in the acid-modified conjugated diene polymer was determined, whereby the content of the structural unit derived from the acid group-containing compound was determined on a weight basis when the weight of the entire acid-modified conjugated diene polymer was set to 100 parts by weight.

Further, separately from this, the content of the water-soluble polymer in the latex of the acid-modified conjugated diene polymer was determined based on the difference between the initial acid amount X1 and the post-treatment acid amount X2.

Further, a solution (solids content: 0.1 wt %) was prepared for measuring the weight average molecular weight of the water-soluble polymer by diluting an aqueous solution of the water-soluble polymer, which was removed from the latex of the acid-modified conjugated diene polymer, with distilled water. For this solution, gel permeation chromatography was performed to calculate the weight average molecular weight (Mw) of the water-soluble polymer as determined relative to the polyethylene oxide and polyethylene glycol standard.

<Viscosity at Solids Content 60 wt %, 50 wt %>

The viscosity of the latex of the acid-modified conjugated diene polymer at the solids content of 60 wt % and the viscosity at the solids content of 50 wt % were measured using a B-type viscometer (Brookfield viscometer, Model BL, manufactured by TOKYO KEIKI INC.) under a condition of 25° C. When the viscosity at 50 wt % of the solids content was measured, water was added to the latex of the acid-modified conjugated diene polymer and the measurement was carried out as a state of being diluted to 50 wt % of the solids content.

<Tensile Strength of Dip-Molded Product>

In accordance with ASTM D412, the dip-molded product was punched out with a dumbbell (product name "SUPER DUMBBELL (type: SDMK-100C)", manufactured by DUMBBELL CO., LTD.) to produce a test piece for tensile strength measurement. The test piece was stretched at a stretching speed of 500 mm/min by using a TENSILON Universal Material Testing Instrument (product name "RTG-1210", available from ORIENTEC CORPORATION) to measure the tensile strength (unit: MPa) immediately before break.

<Tear Strength of Dip-Molded Product>

In accordance with ASTM D624-00, a dip-molded product was allowed to stand still in a constant-temperature and constant-humidity room at 23° C. and a relative humidity of 50% for 24 hours or more, and then was punched out by using a dumbbell (product name "Die C", manufactured by DUMBBELL CO., LTD.) to prepare a test piece for tear strength measurement. The test piece was stretched at a stretching speed of 500 mm/min by using a TENSILON Universal Material Testing Instrument (product name "RTG-1210", available from A&D Company, Limited) to measure the tear strength (unit: N/mm).

Example 1

(Preparation of Latex of Acid-Modified Synthetic Polyisoprene)

1150 parts of toluene with a water content of 3 weight ppm dried by molecular sieves and 100 parts of isoprene were placed in a dried, nitrogen-purged autoclave equipped with a stirrer. Then, the temperature in the autoclave was brought to 60° C., and 0.114 parts of normal butyllithium was added under stirring to react for 2 hours, and then 0.017 parts of methanol was added as a polymerization terminator, and the reaction was stopped to obtain a toluene solution of synthetic polyisoprene (A-1) (solids content: 8.0 wt %). The weight average molecular weight of the synthesized polyisoprene in the toluene solution was 620,000.

Then, 750 parts of toluene was added to 100 parts of the synthetic polyisoprene in the toluene solution of synthetic polyisoprene (A-1) to dilute the toluene solution, and the diluted toluene solution was placed in a polymerization reaction vessel equipped with a stirrer, and the temperature was heated to 40° C. under stirring. Further, using another vessel, 3 parts of methacrylic acid and 57 parts of toluene were mixed to prepare a toluene solution of methacrylic acid. This toluene solution of methacrylic acid was added to the polymerization reaction vessel heated to 40° C. over a period of 10 minutes, and then 1.8 parts of 2,2'-azobisisobutyronitrile was added to perform the reaction for 1 hour at 40° C., and the reaction was further carried out at 80° C. for 2 hours to obtain the toluene solution of acid-modified synthetic polyisoprene (B-1) (solids content: 5 wt %).

On the other hand, 20 parts of sodium rosinate was added to water, and the temperature was increased to 60° C. to dissolved and prepare a surfactant aqueous solution (C-1) having a concentration of 1.5 wt %.

Then, the toluene solution of acid-modified synthetic polyisoprene (B-1) obtained above and the surfactant aqueous solution (C-1) were mixed in a weight ratio of 1:1.5 by using a mixer (product name "Multi Line mixer MS26-MMR-5.5L", available from SATAKE CHEMICAL EQUIPMENT MFG., LTD.), and then were mixed and emulsified at 4100 rpm by using an emulsifying apparatus (product name "MILDER MDN310", available from Pacific Machinery & Engineering Co., Ltd.) to obtain an emulsified dispersion (D-1). At this time, the total feed flow rate of the toluene solution of acid-modified synthetic polyisoprene (B-1) and the surfactant aqueous solution (C-1) was set at 2,000 kg/hr, the temperature was set at 60° C., and the back pressure (gauge pressure) was set to 0.5 MPa.

Subsequently, the obtained emulsified dispersion (D-1) was heated to 80° C. under a reduced pressure of −0.01 to −0.09 MPa (gauge pressure), thereby distilling off the toluene to obtain an aqueous dispersion of acid-modified synthetic polyisoprene (E-1). At that time, a defoamer (product name "SM5515", available from Dow Coining Toray Co., Ltd.) was continuously added by spraying the defoamer in the amount of 300 weight ppm with respect to the acid-modified synthetic polyisoprene in the emulsified dispersion (D-1). Note that, when toluene was distilled off, the emulsified dispersion (D-1) was adjusted so as to be 70 vol % or less of the tank volume, and stirring was gradually conducted at 60 rpm by using a three-bladed inclined paddle as a stirring blade.

Then, after completion of the distilling off of toluene, the obtained aqueous dispersion of acid-modified synthetic polyisoprene (E-1) was concentrated by centrifugation at 8,000 to 9,000 G by using a continuous centrifuge (product name "SRG510", available from Alfa Laval AB) to obtain a latex of acid-modified synthetic polyisoprene (F-1) having a solids content of 60 wt % as a light liquid. Note that, the conditions for centrifugation were as follows: The solids content of the aqueous dispersion (E-1) before centrifugation was 10 wt %, the flow rate during continuous centrifugation was 1300 kg/hr, and the back pressure (gauge pressure) of the centrifuge was 1.5 MPa. With respect to the obtained latex of acid-modified synthetic polyisoprene (F-1), the content of the water-soluble polymer in the latex, the content of the structural unit derived from the acid group-containing compound in the acid-modified synthetic polyisoprene, and the molecular weight (Mw) of the water-soluble polymer were determined according to the above method.

(Preparation of Latex Composition)

While the latex of the acid-modified synthetic polyisoprene (F-1) obtained above was being stirred, 10 wt % sodium dodecylbenzene sulfonate was added in the amount of 1 part in terms of solids content with respect to 100 parts by weight of the acid-modified synthetic polyisoprene in the latex of the acid-modified synthetic polyisoprene (F-1). Then, while the resulting mixture was being stirred, an aqueous dispersion containing 1.5 parts of zinc oxide, 1.5 parts of sulfur, 2 parts of an antioxidant (product name: "Wingstay L", available from Goodyear Tire and Rubber Company), 0.3 parts of zinc diethyldithiocarbamate, 0.5 parts of zinc dibutyldithiocarbamate, and 0.7 parts of mercaptobenzothiazole zinc salt in terms of solids content with respect to 100 parts of the acid-modified synthetic polyisoprene in the mixture was added. Subsequently, a potassium hydroxide aqueous solution was added to adjust the pH to 10.5, and thus a latex composition was obtained. Then, the obtained latex composition was aged for 48 hours in a constant-temperature water bath adjusted to 30° C.

(Production of Dip-Molded Product)

A glass mold whose surface is ground (around 5 cm in diameter and around 15 cm in length of the ground part) was washed, followed by preheating in an oven at 70° C. Thereafter, the glass mold was immersed in a coagulant aqueous solution composed of 18 wt % of calcium nitrate and 0.05 wt % of polyoxyethylene lauryl ether (product name "EMULGEN 109P", manufactured by Kao Corporation) for 5 seconds, and was taken out. Then, the glass mold coated with coagulant was dried for more than 30 minutes in an oven at 70° C.

Then, the glass mold coated with the coagulant was taken out of the oven, the latex composition obtained above was adjusted to 25° C., and the glass mold was taken out after immersion in this latex composition for 10 seconds, and then air dried at room temperature for 60 minutes to obtain the glass mold coated with a film. Then, the glass mold coated with the film was immersed in hot water at 60° C. for 2 minutes, and then air dried at room temperature for 30 minutes. Thereafter, the glass mold coated with a film was placed in an oven at 120° C., and vulcanization was performed for 20 minutes, and then cooled to room temperature, and talc was sprayed, and then the film was peeled from the glass mold to obtain a dip-molded product. Then, by using the obtained dip-molded product, according to the above method, the measurement of the tensile strength and tear strength was carried out. The results are shown in Table 1.

Example 2

(Production of Latex of Acid-Modified Synthetic Polyisoprene)

1150 parts of cyclohexane with a water content of 3 weight ppm dried by molecular sieves and 100 parts of isoprene were placed in a dried, nitrogen-purged autoclave equipped with a stirrer. Then, the temperature in the autoclave was brought to 60° C., and 0.114 parts of normal butyllithium was added under stirring to react for 2 hours, and then 0.017 parts of methanol was added as a polymerization terminator, and the reaction was stopped to obtain a cyclohexane solution of synthetic polyisoprene (A-2) (solids content: 8.0 wt %). The weight average molecular weight of the synthesized polyisoprene in the cyclohexane solution was 570,000.

Then, 750 parts of toluene was added to 100 parts of the synthetic polyisoprene in the cyclohexane solution of synthetic polyisoprene (A-2) to dilute the cyclohexane solution, and the cyclohexane solution diluted by toluene was placed in a polymerization reaction vessel equipped with a stirrer, and the temperature was heated to 40° C. under stirring. Further, using another vessel, 3 parts of maleic anhydride and 57 parts of toluene were mixed to prepare a toluene solution of maleic anhydride. This toluene solution of maleic anhydride was added to the polymerization reaction vessel heated to 40° C. over a period of 10 minutes, and then 1.8 parts of 2,2'-azobisisobutyronitrile was added to perform the reaction for 1 hour at 40° C., and the reaction was further carried out at 65° C. for 2 hours to obtain a cyclohexane/toluene solution of acid-modified synthetic polyisoprene (B-2) (solids content: 5.1 wt %).

Then, an emulsified dispersion (D-2) and an aqueous dispersion of acid-modified synthetic polyisoprene (E-2) were obtained in the same manner as in Example 1, except that the cyclohexane/toluene solution of acid-modified synthetic polyisoprene (B-2) obtained was used, and a centrifugation process by a continuous centrifuge was performed in the same manner as in Example 1 to obtain a latex of acid-modified synthetic polyisoprene (F-2) having a solids content of 60 wt %. With respect to the latex (F-2) of the obtained acid-modified synthetic polyisoprene, according to the above method, the amount of the water-soluble polymer in the latex of the acid-modified synthetic polyisoprene, the content of the structural unit derived from the acid group-containing compound in the acid-modified synthetic polyisoprene, and the molecular weight (Mw) of the water-soluble polymer were determined.

(Preparation of Latex Composition and Production of Dip-Molded Product)

Then, preparation of a latex composition and production of a dip-molded product were carried out in the same manner as in Example 1, except that the latex of acid-modified synthetic polyisoprene (F-2) obtained above was used, and evaluation was performed in the same manner. The results are shown in Table 1.

Example 3

(Production of Latex of Acid-Modified Synthetic Polyisoprene)

1150 parts of cyclohexane with a water content of 3 weight ppm dried by molecular sieves and 100 parts of synthetic polyisoprene (product name: "IR2200L", available from Zeon Corporation, a synthetic polyisoprene polymerized by using a Ti—Al based polymerization catalyst) were placed in a dried, nitrogen-purged autoclave equipped with a stirrer. Then, the temperature in the autoclave was brought to 30° C., and the synthetic polyisoprene was dissolved by stirring to obtain a cyclohexane solution of synthetic polyisoprene (A-3) (solids content: 8.0 wt %). The weight average molecular weight of the synthesized polyisoprene in the cyclohexane solution was 1,270,000.

Then, 750 parts of toluene was added to 100 parts of the synthetic polyisoprene in the cyclohexane solution of synthetic polyisoprene (A-3) to dilute the cyclohexane solution, and the cyclohexane solution diluted by toluene was placed in a polymerization reaction vessel equipped with a stirrer, and the temperature was heated to 40° C. under stirring. Further, using another vessel, 3 parts of maleic anhydride and 57 parts of toluene were mixed to prepare a toluene solution of maleic anhydride. This toluene solution of maleic anhydride was added to the polymerization reaction vessel heated to 40° C. over a period of 10 minutes, and then 1.8 parts of 2,2'-azobisisobutyronitrile was added to perform the reaction for 1 hour at 40° C., and the reaction was further carried out at 65° C. for 2 hours to obtain a cyclohexane/toluene solution of acid-modified synthetic polyisoprene (B-3) (solids content: 4.9 wt %).

Then, an emulsified dispersion (D-3) and an aqueous dispersion of acid-modified synthetic polyisoprene (E-3) were obtained in the same manner as in Example 1, except that the obtained cyclohexane/toluene solution of acid-modified synthetic polyisoprene (B-3) was used, and a centrifugation process by a continuous centrifuge was performed in the same manner as in Example 1 to obtain a latex of acid-modified synthetic polyisoprene (F-3) having a solids content of 60 wt %. With respect to the obtained latex of acid-modified synthetic polyisoprene (F-3), according to the above method, the amount of the water-soluble polymer in the latex of acid-modified synthetic polyisoprene, the content of the structural unit derived from the acid group-containing compound in the acid-modified synthetic polyisoprene, and the molecular weight (Mw) of the water-soluble polymer were determined.

(Preparation of Latex Composition and Production of Dip-Molded Product)

Then, preparation of a latex composition and production of a dip-molded product were carried out in the same manner as in Example 1, except that the latex of acid-modified synthetic polyisoprene (F-3) obtained above was used, and evaluation was performed in the same manner. The results are shown in Table 1.

Example 4

(Production of Latex of Acid-Modified Synthetic Polyisoprene)

750 parts of toluene was added to 100 parts of the synthetic polyisoprene in the cyclohexane solution of synthetic polyisoprene (A-2) obtained in the same manner as Example 2 to dilute the cyclohexane solution, and the cyclohexane solution diluted by toluene was placed in a polymerization reaction vessel equipped with a stirrer, and the temperature was heated to 30° C. under stirring. Further, using another vessel, 3 parts of maleic anhydride and 57 parts of toluene were mixed to prepare a toluene solution of maleic anhydride. This toluene solution of maleic anhydride was added to the polymerization reaction vessel heated to 40° C. over a period of 10 minutes, and then 0.5 parts of benzoylperoxide, 0.32 parts of sodium formaldehyde sulfoxylate (product name "SFS", manufactured by Mitsubishi Gas Chemical Inc.), and 0.011 parts of ethylenediaminetetraacetic acid iron sodium complex (trade name "Frost Fe", manufactured by Chubu Chilest Co., Ltd.) was added to perform the reaction for 1 hour at 30° C., and the reaction was further carried out at 65° C. for 2 hours to obtain a cyclohexane/toluene solution of acid-modified synthetic polyisoprene (B-4) (solids content: 5.0 wt %).

Then, an emulsified dispersion (D-4) and an aqueous dispersion of acid-modified synthetic polyisoprene (E-4) were obtained in the same manner as in Example 1, except that the obtained cyclohexane/toluene solution of acid-modified synthetic polyisoprene (B-4) was used, and a centrifugation process by a continuous centrifuge was performed in the same manner as in Example 1 to obtain a latex of acid-modified synthetic polyisoprene (F-4) having a solids content of 60 wt %. With respect to the obtained latex of acid-modified synthetic polyisoprene (F-4), according to the above method, the amount of the water-soluble polymer in the latex of the acid-modified synthetic polyisoprene, the content of the structural unit derived from the acid group-containing compound in the acid-modified synthetic polyisoprene, and the molecular weight (Mw) of the water-soluble polymer were determined.

(Preparation of Latex Composition and Production of Dip-Molded Product)

Then, preparation of a latex composition and production of a dip-molded product were carried out in the same manner as in Example 1, except that the latex of acid-modified synthetic polyisoprene (F-4) obtained above was used, and evaluation was performed in the same manner. The results are shown in Table 1.

Example 5

(Production of Latex of Acid-Modified Synthetic Polyisoprene)

750 parts of toluene was added to 100 parts of the synthetic polyisoprene in the toluene solution of synthetic polyisoprene (A-1) obtained in the same manner as Example 1 to dilute the toluene solution, and the diluted toluene solution was placed in a polymerization reaction vessel equipped with a stirrer, and the temperature was heated to 40° C. under stirring. Further, using another vessel, 3 parts of maleic anhydride and 57 parts of toluene were mixed to prepare a toluene solution of maleic anhydride. This toluene solution of maleic anhydride was added to the polymerization reaction vessel heated to 40° C. over a period of 10 minutes, and then 1.8 parts of 2,2'-azobisisobutyronitrile was added to perform the reaction for 1 hour at 40° C., and the reaction was further carried out at 80° C. for 2 hours to obtain a toluene solution of acid-modified synthetic polyisoprene (B-5) (solids content: 5.0 wt %).

Then, except that the obtained toluene solution of acid-modified synthetic polyisoprene (B-5) was used, in the same manner as in Example 1, while obtaining an emulsified dispersion (D-5) and an aqueous dispersion of acid-modified synthetic polyisoprene (E-5), in place of the centrifugation process by a continuous centrifuge, concentration was performed by microfiltration with a microfiltration membrane made of polyethylene (product name "Microza MF", manufactured by Asahi Kasei Corporation, pore size: 0.5 μm) to obtain a latex of acid-modified synthetic polyisoprene (F-5) having a solids content of 60 wt %. With respect to the obtained latex of acid-modified synthetic polyisoprene (F-5), according to the above method, the amount of the water-soluble polymer in the latex of the acid-modified synthetic polyisoprene, the content of the structural unit derived from the acid group-containing compound in the acid-modified synthetic polyisoprene, and the molecular weight (Mw) of the water-soluble polymer were determined.

(Preparation of Latex Composition and Production of Dip-Molded Product)

Then, preparation of a latex composition and production of a dip-molded product were carried out in the same manner as in Example 1, except that the latex of acid-modified synthetic polyisoprene (F-5) obtained above was used, and evaluation was performed in the same manner. The results are shown in Table 1.

Example 6

(Production of Latex of Acid-Modified Styrene-Isoprene-Styrene Block Copolymer)

1150 parts of toluene with a water content of 3 weight ppm dried by molecular sieves and 100 parts of styrene-isoprene-styrene block copolymer (SIS) (styrene-isoprene-styrene block copolymer obtained by polymerization with normal butyllithium) were placed in a dried, nitrogen-purged autoclave equipped with a stirrer. Then, the temperature in the autoclave was brought to 30° C., and the styrene-isoprene-styrene block copolymer was dissolved by stirring to obtain a toluene solution of styrene-isoprene-styrene block copolymer (A-6) (solids content: 8.0 wt %). The weight average molecular weight of the styrene-isoprene-styrene block copolymer in toluene solution was 250,000.

750 parts of toluene was added to 100 parts of the styrene-isoprene-styrene block copolymer in the toluene solution of styrene-isoprene-styrene block copolymer (A-6) to dilute the toluene solution, and the diluted toluene solution was placed in a polymerization reaction vessel equipped with a stirrer, and the temperature was heated to 40° C. under stirring. Further, using another vessel, 3 parts of methacrylic acid and 57 parts of toluene were mixed to prepare a toluene solution of methacrylic acid. This toluene solution of methacrylic acid was added to the polymerization reaction vessel heated to 40° C. over a period of 10 minutes, and then 1.8 parts of 2,2'-azobisisobutyronitrile was added to perform the reaction for 1 hour at 40° C., and the reaction was further carried out at 80° C. for 2 hours to obtain a toluene solution of acid-modified styrene-isoprene-styrene block copolymer (B-6) (solids content: 5.2 wt %).

Then, an emulsified dispersion (D-6) and an aqueous dispersion of acid-modified styrene-isoprene-styrene block copolymer (E-6) were obtained in the same manner as in Example 1, except that the obtained toluene solution of acid-modified styrene-isoprene-styrene block copolymer (B-6) was used, and a centrifugation process by a continuous centrifuge was performed in the same manner as in Example 1 to obtain a latex of acid-modified styrene-isoprene-styrene block copolymer (F-6) having a solids content of 60 wt %. With respect to the obtained latex of acid-modified styrene-isoprene-styrene block copolymer (F-6), the amount of the water-soluble polymer in the latex of the acid-modified styrene-isoprene-styrene block copolymer, and the content of the structural unit derived from the acid group-containing compound in the acid-modified styrene-isoprene-styrene block copolymer were determined according to the above method.

(Preparation of Latex Composition and Production of Dip-Molded Product)

Then, preparation of a latex composition and production of a dip-molded product were carried out in the same manner as in Example 1, except that the latex of acid-modified styrene-isoprene-styrene block copolymer (F-6) obtained above was used, and evaluation was performed in the same manner. The results are shown in Table 1.

Comparative Example 1

(Production of Latex of Acid-Modified Synthetic Polyisoprene)

1150 parts of cyclohexane with a water content of 3 weight ppm dried by molecular sieves and 100 parts of synthetic polyisoprene (product name: "IR2200L", available from Zeon Corporation, a synthetic polyisoprene polymerized by using a Ti—Al based polymerization catalyst) were placed in a dried, nitrogen-purged autoclave equipped with a stirrer. Then, the temperature in the autoclave was brought to 30° C., and the synthetic polyisoprene was dissolved by stirring to obtain a cyclohexane solution of synthetic polyisoprene (A-7) (solids content: 8.0 wt %). The weight average molecular weight of the synthesized polyisoprene in cyclohexane solution was 1,270,000.

Then, 750 parts of toluene was added to 100 parts of the synthetic polyisoprene in the cyclohexane solution of synthetic polyisoprene (A-7) to dilute the cyclohexane solution, and the cyclohexane solution diluted by toluene was placed in a polymerization reaction vessel equipped with a stirrer, and the temperature was heated to 30° C. under stirring. Further, using another vessel, 5 parts of methacrylic acid and 55 parts of toluene were mixed to prepare a toluene solution of methacrylic acid. This toluene solution of methacrylic acid was added to the polymerization reaction vessel heated to 30° C. over a period of 10 minutes, and then 0.5 parts of 1,1,3,3-tetramethylbutyl hydroperoxide (product name "PEROCTA H", manufactured by NOF CORPORATION), 0.32 parts of sodium formaldehyde sulfoxylate (product name "SFS", manufactured by Mitsubishi Gas Chemical Inc.), and 0.011 parts of ethylenediaminetetraacetic acid iron sodium complex (trade name "Frost Fe", manufactured by Chubu Chilest Co., Ltd.) was added to perform the reaction for 1 hour at 30° C., and the reaction was further carried out at 65° C. for 2 hours to obtain a cyclohexane/toluene solution of acid-modified synthetic polyisoprene (B-7) (solids content: 5.0 wt %).

Then, while an emulsified dispersion (D-7) and an aqueous dispersion of acid-modified synthetic polyisoprene (E-7) were obtained in the same manner as in Example 1, except that the obtained toluene solution of acid-modified synthetic polyisoprene (B-7) was used, by performing concentration by distillation instead of a centrifugation process by a continuous centrifuge, a latex of acid-modified synthetic polyisoprene (F-7) was obtained having a solids content of 60 wt % by weight. With respect to the obtained latex of acid-modified synthetic polyisoprene (F-7), according to the above method, the amount of the water-soluble polymer in the latex of the acid-modified synthetic polyisoprene, the content of the structural unit derived from the acid group-containing compound in the acid-modified synthetic polyisoprene, and the molecular weight (Mw) of the water-soluble polymer were determined.

(Preparation of Latex Composition and Production of Dip-Molded Product)

Then, preparation of a latex composition and production of a dip-molded product were carried out in the same manner as in Example 1, except that the latex of acid-modified synthetic polyisoprene (F-7) obtained above was used, and evaluation was performed in the same manner. The results are shown in Table 1.

Comparative Example 2

(Production of Latex of Acid-Modified Synthetic Polyisoprene)

1150 parts of pentane (SP value: 7.0 (cal/cm$^3$)$^{1/2}$) with a water content of 3 weight ppm dried by molecular sieves and 100 parts of isoprene were placed in a dried, nitrogen-purged autoclave equipped with a stirrer. Then, the temperature in the autoclave was brought to 30° C., and 0.114 parts of normal butyllithium was added under stirring to react for 2 hours, and then 0.017 parts of methanol was added as a polymerization terminator, and the reaction was stopped to obtain a pentane solution of synthetic polyisoprene (A-8) (solids content: 8.0 wt %). The weight average molecular weight of the synthesized polyisoprene in toluene solution was 460,000.

Then, 750 parts of pentane was added to 100 parts of the synthetic polyisoprene in the pentane solution of synthetic polyisoprene (A-8) to dilute the pentane solution, and the diluted pentane solution was placed in a polymerization reaction vessel equipped with a stirrer, and the temperature was heated to 30° C. under stirring. Further, using another vessel, 3 parts of methacrylic acid and 57 parts of pentane were mixed to prepare a dispersion of methacrylic acid. This dispersion of methacrylic acid was added to the polymerization reaction vessel heated to 30° C. over a period of 10 minutes, and then 1.8 parts of 2,2'-azobisisobutyronitrile was added to perform the reaction for 3 hour at 30° C. to obtain a pentane solution of acid-modified synthetic polyisoprene (B-8) (solids content: 5.0 wt %).

Then, an emulsified dispersion (D-8) and an aqueous dispersion of acid-modified synthetic polyisoprene (E-8) were obtained in the same manner as in Example 1, except that the obtained pentane solution of acid-modified synthetic polyisoprene (B-8) was used, and a centrifugation process by a continuous centrifuge was performed in the same manner as in Example 1 to obtain a latex of acid-modified synthetic polyisoprene (F-8) having a solids content of 60 wt %. With respect to the obtained latex of acid-modified synthetic polyisoprene (F-8), according to the above method, the amount of the water-soluble polymer in the latex of the acid-modified synthetic polyisoprene, the content of the structural unit derived from the acid group-containing compound in the acid-modified synthetic polyisoprene, and the molecular weight (Mw) of the water-soluble polymer were determined.

TABLE 1

| | Type of conjugated diene polymer | Polymerization catalyst used for polymerization of conjugated diene polymer | Reaction conditions of acid modification | | | | Viscosity with 50 wt % of solids content [mPa · s] |
|---|---|---|---|---|---|---|---|
| | | | Graft-polymerization catalyst | Acid group-containing compound | Organic solvent | Method of concentration | |
| Example 1 | Synthetic polyisoprene | n-butyl lithium | 2.2'-azobisisobutyronitrile | Methacrylic acid | Toluene | Centrifugation | 240 |
| Example 2 | Synthetic polyisoprene | n-butyl lithium | 2.2'-azobisisobutyronitrile | Maleic anhydride | Cyclohexane/Toluene | Centrifugation | 220 |
| Example 3 | Synthetic polyisoprene | Ti—Al based | 2.2'-azobisisobutyronitrile | Maleic anhydride | Cyclohexane/Toluene | Centrifugation | 260 |
| Example 4 | Synthetic polyisoprene | n-butyl lithium | Benzoyl peroxide | Maleic anhydride | Cyclohexane/Toluene | Centrifugation | 230 |
| Example 5 | Synthetic polyisoprene | n-butyl lithium | 2.2'-azobisisobutyronitrile | Maleic anhydride | Toluene | Microfiltration | 280 |
| Example 6 | SIS | n-butyl lithium | 2.2'-azobisisobutyronitrile | Methacrylic acid | Toluene | Centrifugation | 230 |
| Comparative Example 1 | Synthetic polyisoprene | Ti—Al based | 1.1.3.3-tetramethylbutyl hydroperoxide | Methacrylic acid | Cyclohexane/Toluene | Distillation | 450 |
| Comparative Example 2 | Synthetic polyisoprene | n-butyl lithium | 2.2'-azobisisobutyronitrile | Methacrylic acid | Pentane | Centrifugation | 390 |

| | Viscosity with 60 wt % of solids content [mPa · s] | Content of structural unit derived from acid group-containing compound [parts] | Amount of water-soluble polymer latex [parts] | Molecular weight of water-soluble polymer (Mw) | Tensile strength [MPa] | Tear strength [N/mm] |
|---|---|---|---|---|---|---|
| Example 1 | 720 | 0.44 | 1.1 | 4000 | 23 | 37 |
| Example 2 | 680 | 0.47 | 0.7 | 4500 | 25 | 42 |
| Example 3 | 750 | 0.42 | 0.8 | 3500 | 22 | 34 |
| Example 4 | 700 | 0.42 | 1.2 | 2900 | 23 | 31 |
| Example 5 | 780 | 0.40 | 1.9 | 2200 | 21 | 29 |
| Example 6 | 690 | 0.42 | 1.0 | 3700 | 22 | 35 |
| Comparative Example 1 | 870 | 0.40 | 4.5 | 1800 | 20 | 24 |
| Comparative Example 2 | 810 | 0.09 | 2.4 | 1200 | 18 | 25 |

In Table 1, the amount of the water-soluble polymer in the latex is an amount relative to 100 parts of the acid-modified conjugated diene polymer in the latex.

As shown in Table 1, by using the latex in which the content of the structural unit derived from the acid group-containing compound is 0.2 to 0.7 parts by weight in the acid-modified conjugated diene polymer; the content of the water-soluble polymer in the latex is 2 parts by weight or less with respect to 100 parts by weight of the acid-modified conjugated diene polymer; when the solids content of the latex is adjusted to 60 wt %, the viscosity (at 25° C.) is 800 mPa·s or less; and when the solids content of the latex is adjusted to 50 wt %, the viscosity (at 25° C.) is 300 mPa·s or less, the dip-molded bodies obtained by using the latex exhibit the excellent tensile strength and tear strength (Examples 1 to 6).

On the other hand, the dip-molded product obtained by using the latex in which the content of the water-soluble polymer in the latex was more than 2 parts by weight with respect to 100 parts by weight of the acid-modified conjugated diene polymer, and the viscosity (25° C.) with the solids content of 60 wt % was greater than 800 mPa·s and the viscosity (25° C.) with the solids content of 50 wt % was greater than 300 mPa·s was inferior in the tear strength (Comparative Examples 1,2).

The invention claimed is:

1. A latex of an acid-modified conjugated diene polymer comprising the acid-modified conjugated diene polymer obtained by modifying a conjugated diene polymer with an acid group-containing compound,
   wherein a content of a structural unit derived from the acid group-containing compound is 0.2 to 0.7 parts by weight with respect to 100 parts by weight of the acid-modified conjugated diene polymer, a content of a water-soluble polymer in the latex is 2 parts by weight or less with respect to 100 parts by weight of the acid-modified conjugated diene polymer,
   when a solids content of the latex is adjusted to 60 wt %, a viscosity at 25° C. is 800 mPa·s or less, and when the solids content of the latex is adjusted to 50 wt %, the viscosity at 25° C. is 300 mPa·s or less.

2. The latex of the acid-modified conjugated diene polymer according to claim 1, wherein the conjugated diene polymer is synthetic polyisoprene and/or styrene-isoprene-styrene block copolymer.

3. The latex of the acid-modified conjugated diene polymer according to claim 1, wherein the conjugated diene polymer is synthetic polyisoprene.

4. A method for producing the latex of an acid-modified conjugated diene polymer according to claim 1, comprising:
   a step of reacting a conjugated diene polymer with an acid group-containing compound in an organic solvent having an SP value in the range from 7.2 to 10 $(cal/cm^3)^{1/2}$, thereby obtaining an organic solvent solution of the acid-modified conjugated diene polymer in which a content of a structural unit derived from the acid group-containing compound is 0.2 to 0.7 parts by weight with respect to 100 parts by weight of the polymer;
   a step of emulsifying the organic solvent solution of the acid-modified conjugated diene polymer in water in the presence of a surfactant to obtain an emulsified dispersion;
   a step of removing the organic solvent from the emulsified dispersion; and
   a step of concentrating the emulsified dispersion from which the organic solvent is removed by a centrifugation process or microfiltration.

5. The method for producing the latex of the acid-modified conjugated diene polymer according to claim 4, wherein the conjugated diene polymer is synthetic polyisoprene and/or styrene-isoprene-styrene block copolymer.

6. The method for producing the latex of the acid-modified conjugated diene polymer according to claim 4, wherein the conjugated diene polymer is synthetic polyisoprene.

7. The method for producing the latex of the acid-modified conjugated diene polymer according to claim 6, wherein the synthetic polyisoprene is obtained by polymerization with an alkyl lithium polymerization catalyst.

8. The method for producing the latex of the acid-modified conjugated diene polymer according to claim 4, wherein the reaction of the acid group-containing compound with the conjugated diene polymer is performed by using an azo compound-based polymerization catalyst.

9. A latex composition comprising the latex of the acid-modified conjugated diene polymer according to claim 1 and a cross-linking agent.

10. A molded film composed of the latex composition according to claim 9.

11. A substrate with an adhesive layer obtained by forming the adhesive layer on a surface of the substrate, the adhesive layer being formed by using the latex of the acid-modified conjugated diene polymer according to claim 1.

* * * * *